(12) United States Patent
Ghosh (10) Patent No.: US 7,280,348 B2
(45) Date of Patent: Oct. 9, 2007

(54) POSITIONING MECHANISM FOR A PEN-BASED COMPUTING SYSTEM

(75) Inventor: Prosenjit Ghosh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 271 days.

(21) Appl. No.: 10/367,363

(22) Filed: Feb. 14, 2003

(65) Prior Publication Data

US 2004/0160428 A1 Aug. 19, 2004

(51) Int. Cl.
*G06F 1/16* (2006.01)
*G06F 3/02* (2006.01)
*F16M 11/00* (2006.01)

(52) U.S. Cl. ............ 361/681; 361/679; 361/683; 248/917; 248/918; 248/919; 248/920; 248/921; 248/407; 248/408; 248/225.11; 248/393; 345/169; 345/905

(58) Field of Classification Search .. 312/223.1–223.3; 345/169, 905; 248/917–923, 407, 408, 393, 248/225.11; 361/681

See application file for complete search history.

(56) References Cited

U.S. PATENT DOCUMENTS

| | | | |
|---|---|---|---|
| 3,907,346 A | 9/1975 | Van Klompenburg | |
| 5,085,394 A * | 2/1992 | Torii | ............ 248/455 |
| 5,255,154 A | 10/1993 | Hosoi et al. | |
| 5,297,003 A * | 3/1994 | Nomura et al. | ............ 361/680 |
| 5,321,420 A | 6/1994 | Rezek et al. | |
| 5,409,275 A | 4/1995 | Yoshida et al. | |
| 5,494,447 A | 2/1996 | Zaidan | |
| 5,552,957 A * | 9/1996 | Brown et al. | ............ 361/683 |
| 5,619,397 A | 4/1997 | Honda et al. | |
| 5,819,162 A | 10/1998 | Spann et al. | |
| 5,847,924 A | 12/1998 | Youn | |
| 5,867,148 A | 2/1999 | Kamimaki et al. | |
| 6,049,813 A | 4/2000 | Danielson | |
| 6,068,307 A | 5/2000 | Murphy | |
| 6,097,595 A | 8/2000 | Cipolla | |
| 6,100,538 A * | 8/2000 | Ogawa | ............ 250/559.29 |
| 6,122,152 A * | 9/2000 | Goto et al. | ............ 361/1 |
| 6,256,194 B1 | 7/2001 | Choi et al. | |
| 6,429,846 B2 | 8/2002 | Rosenberg et al. | |
| 6,483,698 B1 | 11/2002 | Loh | |
| 6,517,129 B1 | 2/2003 | Chien et al. | |
| 6,532,146 B1 | 3/2003 | Duquette | |

(Continued)

FOREIGN PATENT DOCUMENTS

JP 04-002935 7/1993

*Primary Examiner*—Jayprakash Gandhi
*Assistant Examiner*—Zachary M Pape
(74) *Attorney, Agent, or Firm*—Blakely, Sokoloff, Taylor & Zafman LLP (57) ABSTRACT

In one embodiment, the invention provides a pen-based computing system. The system comprises a tablet unit including a display screen and an electronic assembly housed within an enclosure; and a separate base unit including two panels connected via a hinge, a first one of the panels bearing a keyboard, and a second one of the panels being arcuately displaceable relative to the first panel to prop the tablet unit in a viewing position in which the display screen makes a viewing angle with the keyboard of greater than 90 degrees, wherein the tablet unit and the first panel have complementary formations to prevent sliding movement of the tablet unit relative to the first panel when in the viewing position.

23 Claims, 7 Drawing Sheets

U.S. PATENT DOCUMENTS

| | | |
|---|---|---|
| 6,563,699 B1 | 5/2003 | Choi |
| 6,653,919 B2 | 11/2003 | Shih-Chung et al. |
| 6,761,421 B2 | 7/2004 | Chen et al. |
| 6,762,928 B2 | 7/2004 | Lo |
| 6,775,129 B1 | 8/2004 | Ghosh et al. |
| 6,778,196 B2 * | 8/2004 | Nakamura ................ 345/680 |
| 6,780,019 B1 * | 8/2004 | Ghosh et al. ............... 493/31 |
| 6,825,415 B1 * | 11/2004 | Chen et al. ................. 174/63 |
| 6,829,140 B2 * | 12/2004 | Shimano et al. ........... 361/683 |
| 6,840,791 B2 * | 1/2005 | Hsiu ........................ 439/374 |
| 6,870,740 B2 | 3/2005 | Hsu et al. |
| 6,980,423 B2 * | 12/2005 | Tanaka et al. ............ 361/683 |
| 2003/0080949 A1 | 5/2003 | Ditzik |
| 2003/0142469 A1 | 7/2003 | Ponx |
| 2004/0043650 A1 | 3/2004 | Yang et al. |
| 2004/0155861 A1 | 8/2004 | Jackson, III |
| 2004/0190239 A1 | 9/2004 | Weng et al. |
| 2006/0077622 A1 * | 4/2006 | Keely et al. ............... 361/681 |

\* cited by examiner

POSITIONING MECHANISM FOR A PEN-BASED COMPUTING SYSTEM

FIELD OF THE INVENTION

This invention relates to mobile computing devices. In particular it relates to pen-based mobile computing devices.

BACKGROUND

Pen-based computing systems, unlike conventional laptop or notebook computers, allow data input via a stylus or pen. Briefly, a pen is used to write characters on a portion of the display screen that includes a digitizer. The digitizer captures the handwriting and handwriting recognition software converts the software into recognized text.

During data entry using the keyboard, a viewing angle made between the display screen and the keyboard should be greater than 90 degrees for optimal viewing of the display screen.

Thus, there should be some mechanism to hold the display screen relative to the keyboard at the correct viewing angle.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

FIGS. 1A to 1E show various views of a computing system 10 in accordance with one embodiment of the invention. The system 10 is a pen-based computing system and includes a tablet unit 12 and a base unit 14. The base unit 14 includes first and second generally planar panels 16, 18, respectively. The panels 16, 18 are connected by a flexible hinge 20 which permits relative articulation between the first and second panels 16, 18. The first panel 16 bears a keyboard 22 which permits data entry into the tablet unit 12 when the system 10 is operated in a laptop mode.

Figures 1A, 1B:
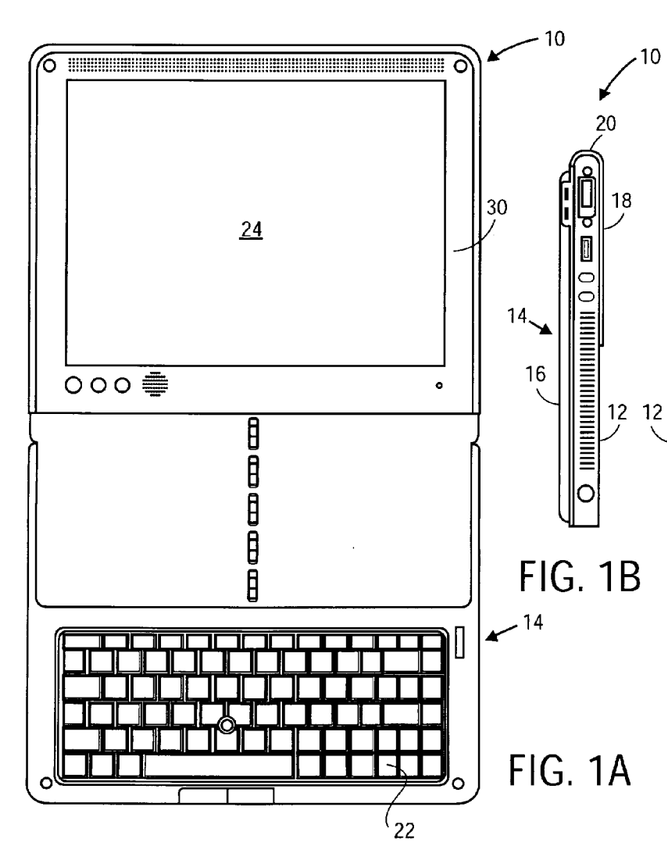
FIGS. 1A to 1E show various view of a computing system, in accordance with one embodiment of the invention.
Figures 1C, 1D:
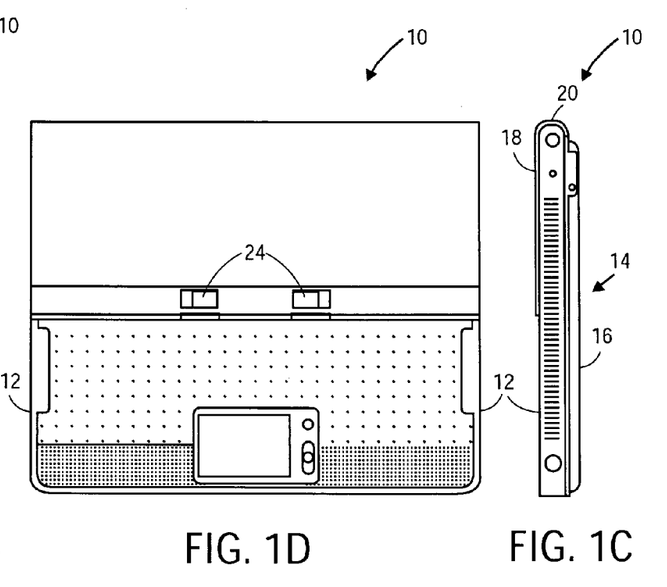
Figure 1E:
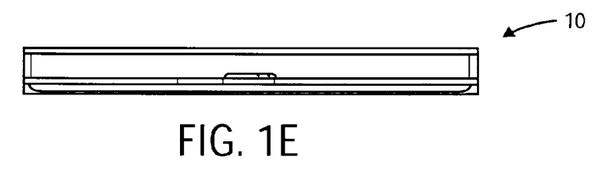

As can be seen in FIGS. 1B, 1C, and 1D of the drawings, the system 10 may be positioned in a carry mode configuration, in which the tablet unit 12 is positioned over the first panel 16 with the second panel 18 of the base unit 14 positioned over the tablet unit 12. In order to secure the system 10 in the carry mode configuration, the second panel 18 of the base unit 14 includes two pivotally mounted latches 24 which engage complementary locking formations provided in the tablet unit 12 to releaseably lock the second panel 18 to the tablet unit 12. It will be noted that, in the carry mode configuration, the system 10 resembles a portfolio (see FIG. 1D of the drawings).

Components of the tablet unit 12 typically include one or more processing components, a memory hierarchy comprising a number of memory devices, and a display screen 24 including a digitizer.

Figure 2:
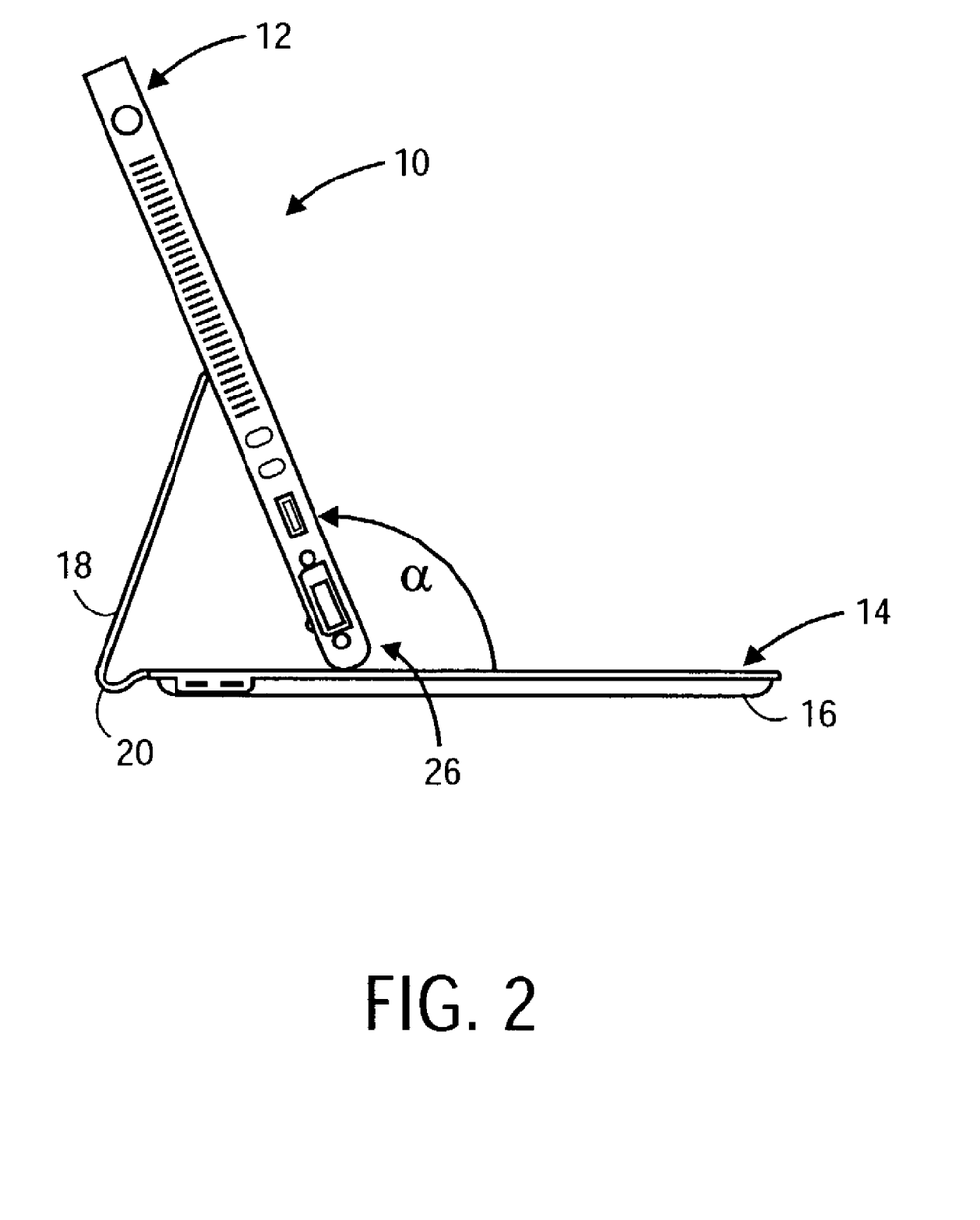
FIG. 2 shows a side view of the system of FIG. 1, when in a laptop mode configuration.

FIG. 2 of the drawings, shows a configuration of the system 10 that is used for data entry via the keyboard 22. This configuration is known as the laptop mode configuration and comprises the tablet unit 12 held at an inclined position relative to the first panel 16 so that the display screen 24 of the tablet unit 12 makes a viewing angle α with the keyboard 22 of greater than 90 degrees. In the laptop mode configuration, the tablet unit 12 is propped by the second panel 18 of the base unit 14 which is releaseably secured thereto via the latches 24 described above. The curved section of the hinge 20 is coplanar with the bottom surface of the first panel 16. In a viewing position, a load from the tablet unit 12 is directed through the second panel 18 to the hinge 20, wherein the bend in the curved section of the hinge 20 disperses some of the load acting on the hinge 20 away from the first panel 16.

Figure 3A:
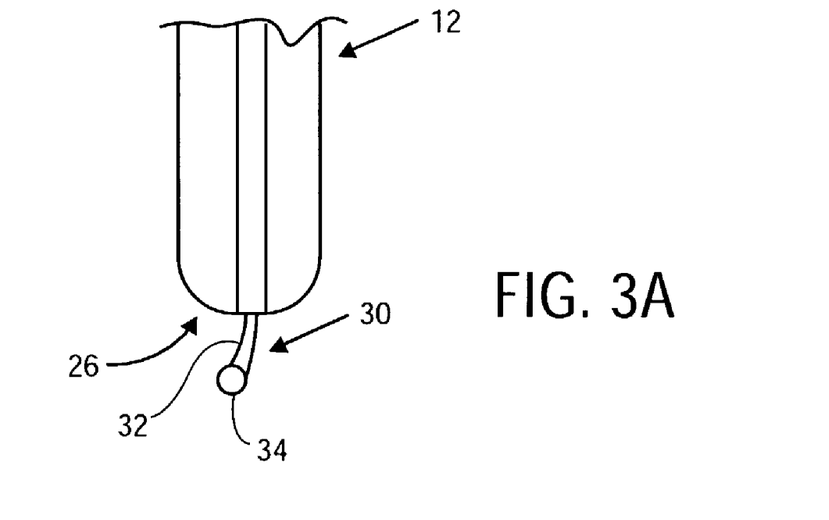
FIGS. 3A and 3B show views of a complementary formation mounted on the tablet unit of the system of FIGS. 1A to 1E to prevent sliding movement of the tablet unit, in accordance with one embodiment of the invention.
Figure 3B:
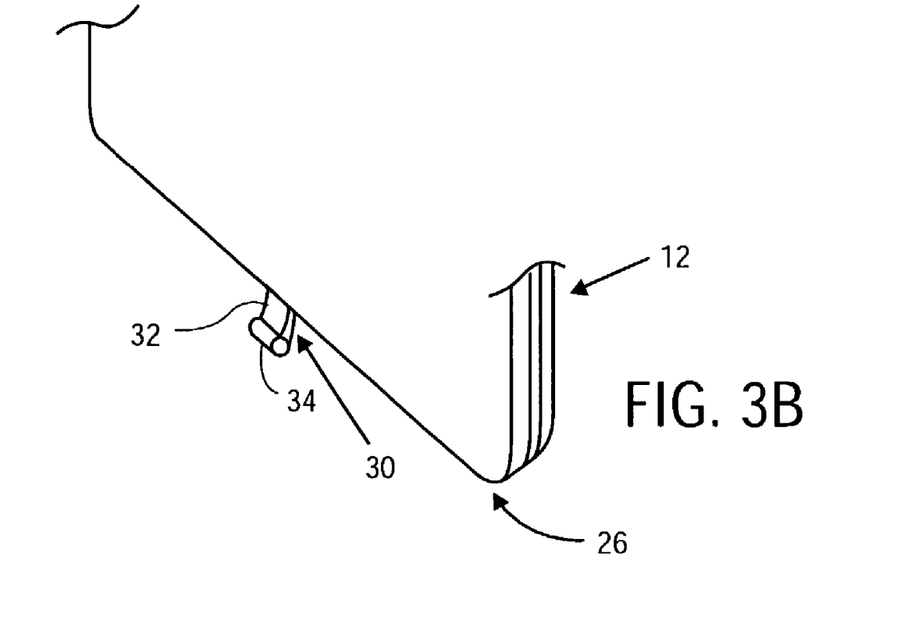
Figure 4A:
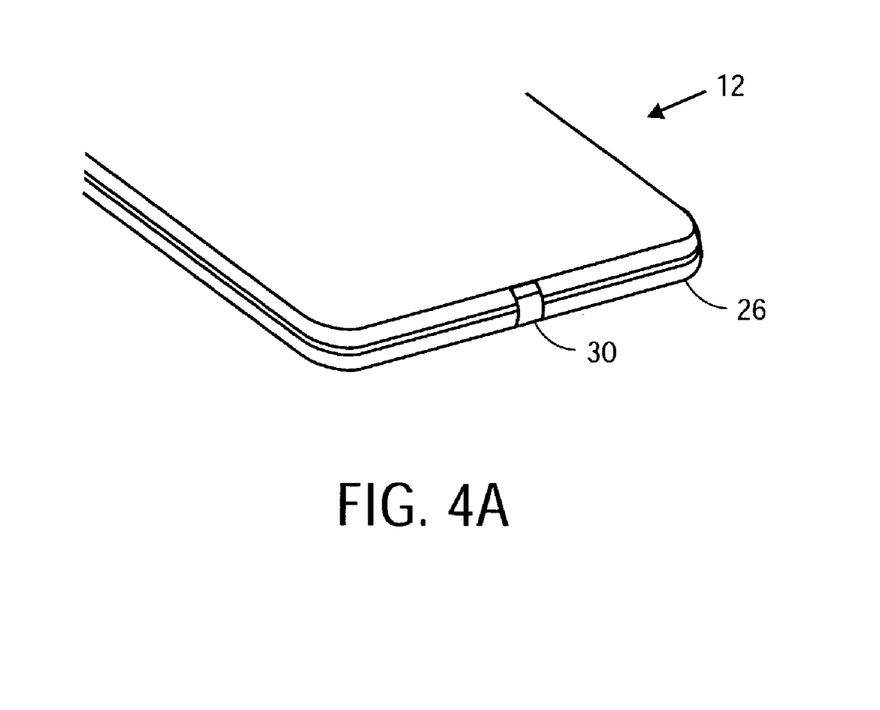
FIG. 4A shows the complementary formation of FIGS. 3A and 3B when in a stowed position.
Figure 4B:
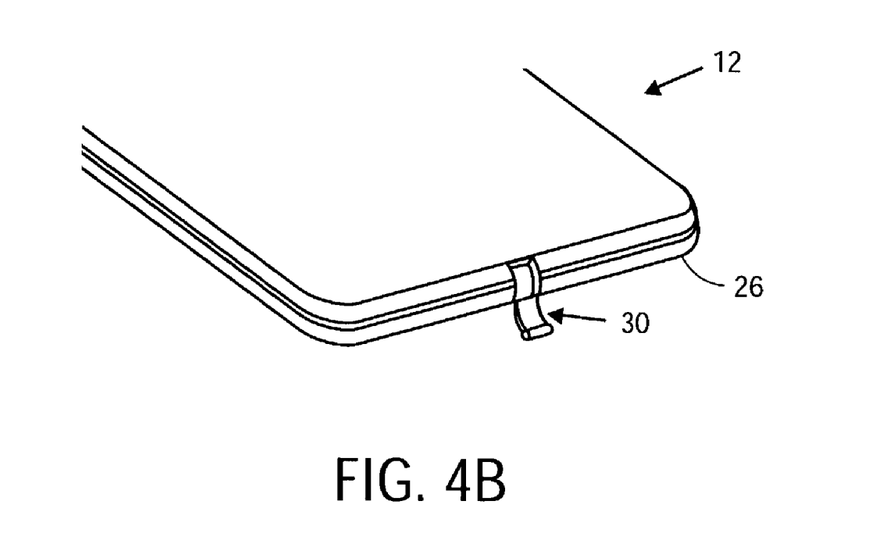
FIG. 4B shows the complementary formation of FIGS. 3A and 3B when in an extended position.

It will be appreciated that when in the laptop mode configuration, a leading edge 26 of the tablet unit 12 has to be arrested to prevent sliding movement thereof relative to the base unit 14. Accordingly, in one embodiment of the present invention, there is provided complementary formations on the tablet unit 12, and the base unit 14, to prevent sliding movement of the tablet unit 12 relative to the first panel 16, when the system 10 is in the laptop mode configuration, as shown in FIG. 2 of the drawings. In one embodiment, as shown in FIGS. 3A and 3B of the drawings, the complementary formations of the tablet unit 12 include a male formation which defines a spigot 30. The spigot 30 is pivotally secured to the tablet unit 12, for example using a transverse pivot pin (not shown) and may be operated to articulate between a stowed position in which it is completely within the housing or enclosure of the tablet unit 12 (see FIG. 4A), and an extended position in which it protrudes from the housing as is shown in FIG. 4B. As can be seen from FIG. 3A of the drawings, the spigot 30 includes a thin neck region 32 and an enlarged head 34.

In order to receive the spigot 30, the base unit 14 includes a complementary female formation shaped and dimensioned to receive the spigot 30 in snug fit therein. As will be seen from FIG. 5A of the drawings, in one embodiment, the base unit 14 includes a plurality of female formations 36 disposed along the longitudinal axis. Each of the female formations 36 may be selectively engaged by a spigot 30 to secure the tablet unit 12 when in the laptop mode configuration. It will be appreciated that the plurality of female formations 36 allows for selection of different viewing angles.

Figure 5A:
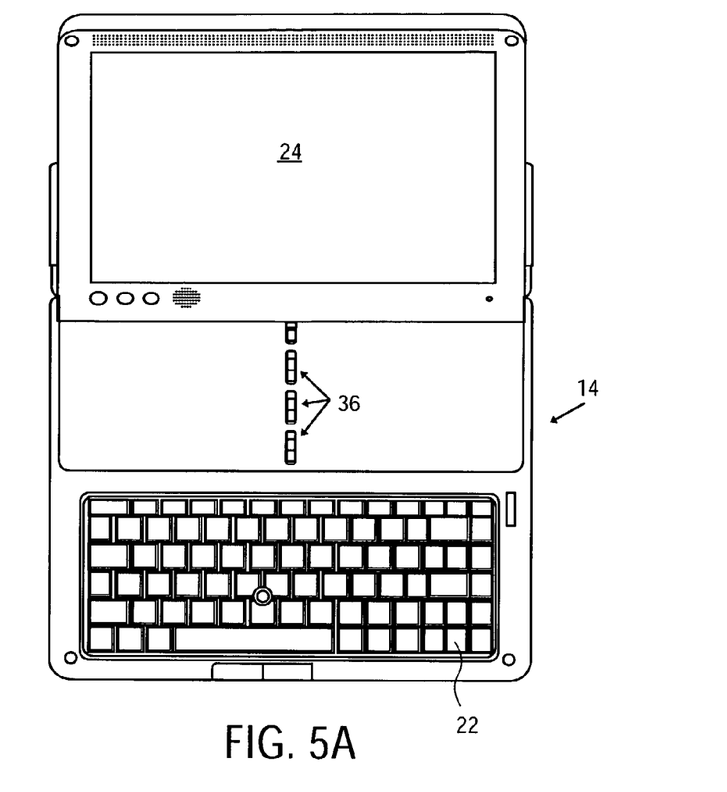
FIG. 5A shows a top view of the system of FIGS. 1A and 1E, when in the laptop mode configuration.
Figure 5B:
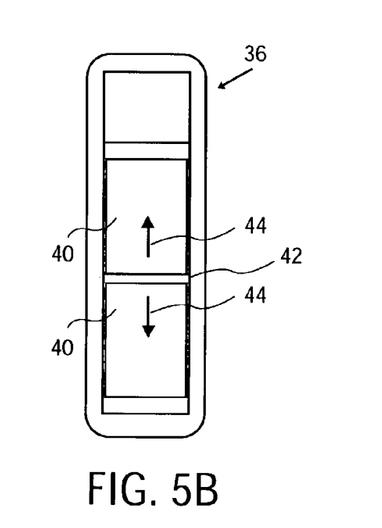
FIG. 5B shows a complementary formation of a base unit of the system of FIGS. 1A to 1E, in accordance with one embodiment of the invention.

FIG. 5B of the drawings shows one of the female formations 36 of the FIG. 5A in greater detail. As will be seen, the female formation 36 includes two sliding members 40 which are mounted within a recess in the base unit 14 to define a transverse slot 42 within which the spigot 30 is receivable. The sliding members 40 are biased under the influence of a biasing element to close the transverse slot 42 therebetween. In one embodiment, the biasing element may include a coil spring. In use, the spigot 30 urges the sliding members to move in an outward direction indicated by the arrows 44 in FIG. 5B to allow the enlarged head 34 of the spigot 30 to be received in the transverse slot 42. Thereafter, under influence of the biasing force of the biasing elements, the sliding members 40 close behind the enlarged head 34 to bear against the neck 32 of the spigot 30, thus locking the spigot 30 to the female formation 36. In one embodiment, the head 32 of the spigot 30 and the sliding members 40 may be contoured to allow the head 32 to move into the slot 42 with minimal force. For example, the edges of the sliding members 40 adjacent the transverse slot 42 may be inclined to guide the head 34 into the slot 42.

Figure 5C:
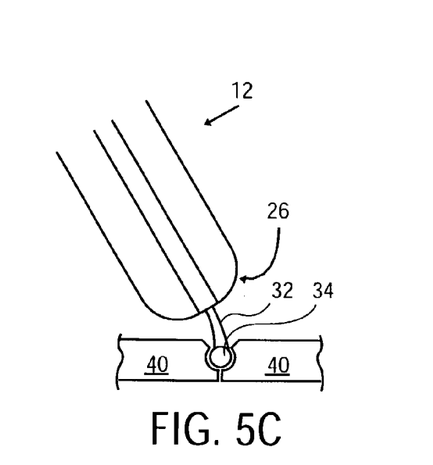
FIG. 5C illustrates how the complementary formation of the base and tablet units cooperate, in accordance with one embodiment.
Figure 6A:
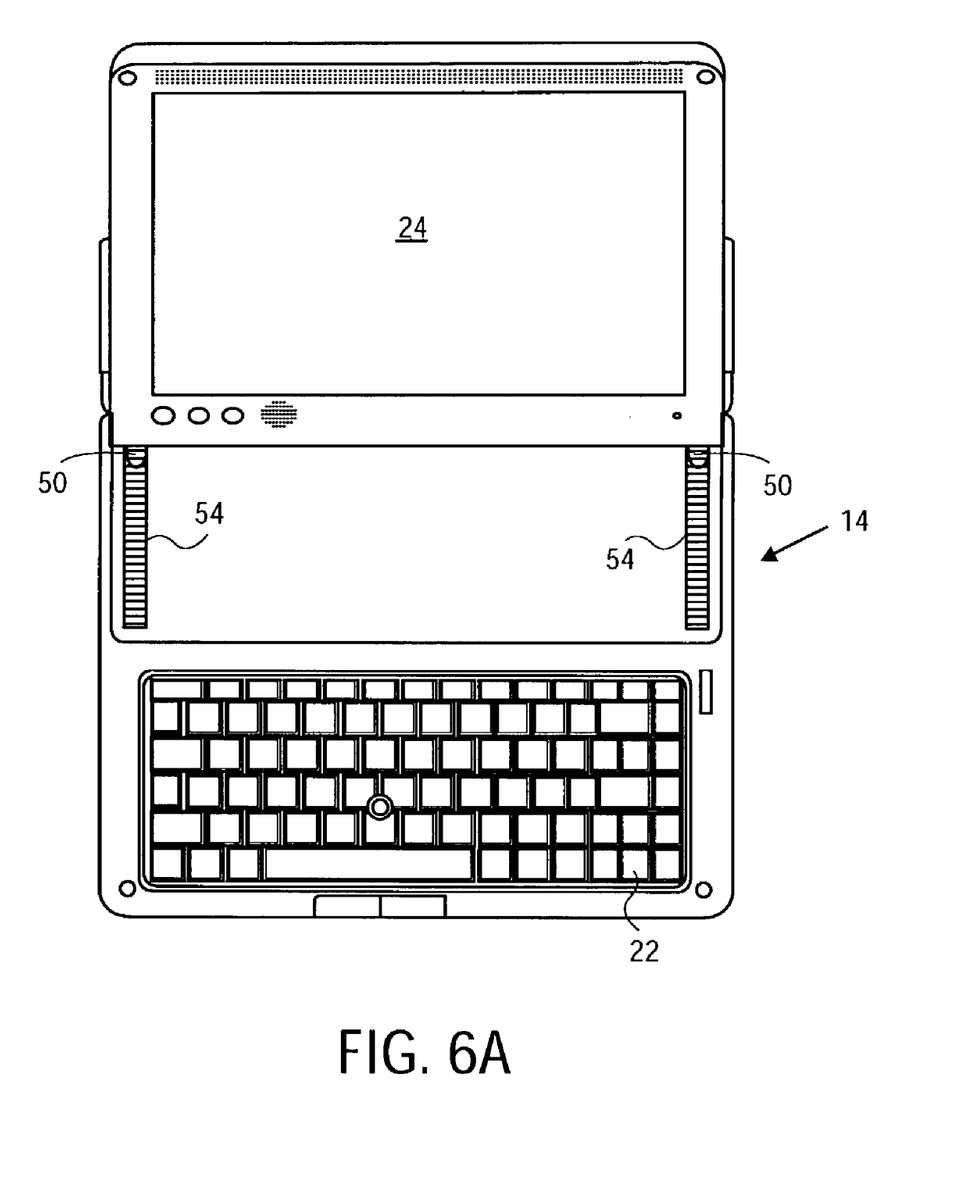
FIG. 6A shows a top plan view of the system of FIGS. 1A to 1E, in the laptop mode configuration in which complementary formations of the base unit, in accordance with another embodiment of the invention, may be seen.
Figure 6B:
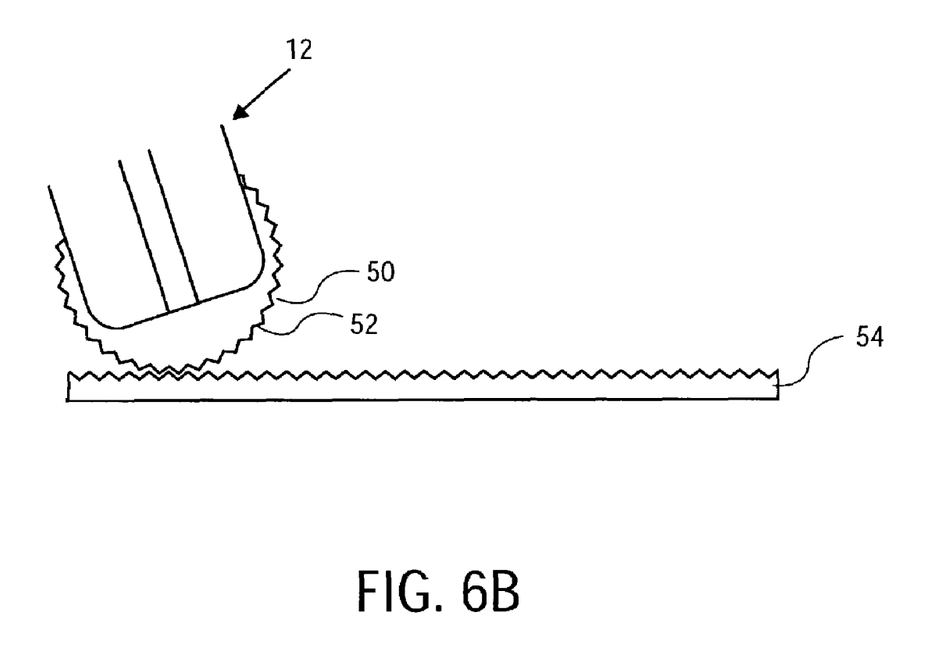
FIG. 6B illustrates the operation of the complementary formation of the embodiment shown in FIG. 6A.

The complementary formations on the tablet unit 12, and the base unit 14, need not be male-female type formations. For example, as can be seen in FIGS. 6A and 6B of the drawings, the complementary formations of the tablet unit 12 may include a rotatable member in the form of a wheel 50 having a plurality of circumferencially spaced teeth 52. In this embodiment, the complementary formations of the base unit 14 may then include an elongate track 54 provided with complementary teeth to engage the teeth 52 of the wheel 50. As can be seen in FIG. 6A of the drawings, in one embodiment, the tablet unit 12 includes two laterally-spaced wheels 50 and the base unit 14 includes two corresponding tracks 54 to receive the wheels 50 therein. Instead of the discrete new angles provided by the embodiment described with reference to FIGS. 5A to 5C of the drawings, the embodiment shown in FIGS. 6A and 6B provide a continuous range of viewing angles each of which is defined by the position of the wheels 50 within the tracks 54.

In an embodiment not shown, in order to prevent sliding movement of the tablet unit 12 relative to the first panel 16 of the base unit 14, the first panel 16 may include a non-slip or high friction surface. Further, portions of the tablet unit that contact the panel 16 when the system 10 is in the desktop mode configuration may include a rough or serrated surface to further prevent sliding of the tablet unit 12 relative to the panel 16.

Although the present invention has been described with reference to specific exemplary embodiments, it will be evident that the various modification and changes can be made to these embodiments without departing from the broader spirit of the invention as set forth in the claims.

Accordingly, the specification and drawings are to be regarded in an illustrative sense rather than in a restrictive sense.

What is claimed is:

1. A pen-based computing system comprising:
   a tablet unit including a display screen and an electronic assembly housed within an enclosure; and
   a separate base unit including two panels connected via a hinge,
   a first one of the panels bearing a keyboard, and
   a second one of the panels being arcuately displaceable relative to the first panel to prop the tablet unit in a viewing position in which the display screen makes a viewing angle with the keyboard of greater than 90 degrees,
   wherein the tablet unit and the first panel have complementary formations to prevent sliding movement of the tablet unit relative to the first panel when in the viewing position,
   wherein the complementary formations include a male formation on the tablet unit shaped and dimensioned to mate with a complementary female formation on the first panel;
   wherein the first panel includes a plurality of the female formations spaced along a longitudinal axis; and
   wherein each female formation comprises two sliding members having ends contoured to form a recess to receive the male formation therein in a snug fit, wherein the sliding members are urged toward each other to close the recess.

2. The system of claim 1, wherein the male formation is operable between a stowed position in which it resides within the enclosure of the tablet unit, and an extended position in which it protrudes from the enclosure.

3. The system of claim 1, wherein the male formation is pivotally mounted to the enclosure.

4. The system of claim 1, wherein the male formation includes an enlarged head shaped and dimensioned to be retained by the sliding members within the recess.

5. The system of claim 1, further comprising:
   a flexible hinge connecting the first and second panels;
   wherein the second panel comprises a curved portion near the hinge; and
   wherein, when the tablet is in a viewing position and the second panel is in contact with the tablet unit and the bottom of the first panel rests on a planar surface, the curved portion of the second panel lies in the same planar surface as the bottom of the first panel.

6. A pen-based computing system comprising:
   a base unit including a first and second panel connected by a flexible hinge;
   wherein the first panel has a generally flat body including a keyboard, and
   wherein the flexible hinge comprises a curved section extending into the second panel;
   a tablet unit comprising:
      a processing component including a processor coupled to a memory;
      a display component including a digitizer to capture data entered with the pen and a display screen coupled to the processing component;
      an enclosure defining a housing for the processing component and the display component,
   wherein the enclosure includes a mechanical stop to check sliding motion of the tablet unit relative to the first panel when the tablet unit is supported on the first panel so that it makes an acute angle therewith;

wherein the second panel is in contact with the tablet unit in the said acute angle with the first panel;

wherein the curved section of the hinge is coplanar with the bottom surface of the first panel;

wherein a load from the tablet unit is directed through the second panel to the hinge, wherein the bend in the curved section of the hinge disperses some of the load acting on the hinge away from the first panel.

7. The tablet unit of claim 6, wherein the mechanical stop comprises a spigot formation shaped and dimensioned to engage a complementary socket formation of the base unit.

8. The tablet unit of claim 7, wherein the spigot formation is operable between a stowed position in which it is within the enclosure and an extended position in which it projects from the enclosure.

9. The system of claim 6, wherein the tablet unit and the first panel have complementary formations to prevent sliding movement of the tablet unit relative to the first panel when in the viewing position;

wherein the complementary formations include a male formation on the tablet unit shaped and dimensioned to mate with a complementary female formation on the first panel;

wherein the first panel includes a plurality of the female formations spaced along a longitudinal axis; and wherein each female formation comprises two sliding members having ends contoured to form a recess to receive the male formation therein in a snug fit, wherein the sliding members are urged toward each other to close the recess.

10. The system of claim 9, wherein the male formation includes an enlarged head shaped and dimensioned to be retained by the sliding members within the recess.

11. The system of claim 6, wherein the second panel is displaceable relative to the first panel to prop the tablet unit in a viewing position in which the display screen makes a viewing angle with the keyboard of greater than 90 degrees.

12. A pen-based computing system comprising:

a tablet unit comprising:
 a processing component and a display component including a digitizer to capture data entered with the pen and housed within an enclosure;

a base unit comprising:
 a first and second panel connected by a flexible hinge;
 wherein the first panel has a generally flat body having a keyboard and at least one socket formation shaped and dimensioned to receive a spigot-like formation of the tablet unit, thereby to check sliding motion of the tablet unit relative to the first panel when the tablet unit is supported by the first panel so that it makes an acute angle therewith;
 wherein the flexible hinge comprises a curved portion extending into the second panel;
 wherein the second panel is in contact with the tablet unit in the said acute angle with the first panel;
 wherein the curved section of the hinge is coplanar with the bottom surface of the first panel;
 wherein, when in a viewing position, a load from the tablet unit is directed through the second panel to the hinge, wherein the bend in the curved section of the hinge disperses some of the load acting on the hinge away from the first panel.

13. The base unit of claim 12, wherein the first panel comprises a plurality of socket formations disposed along a longitudinal axis.

14. The system of claim 12, wherein the tablet unit and the first panel have complementary formations to prevent sliding movement of the tablet unit relative to the first panel when in the viewing position;

wherein the complementary formations include a male formation on the tablet unit shaped and dimensioned to mate with a complementary female formation on the first panel;

wherein the first panel includes a plurality of the female formations spaced along a longitudinal axis; and wherein each female formation comprises two sliding members having ends contoured to form a recess to receive the male formation therein in a snug fit, wherein the sliding members are urged toward each other to close the recess.

15. The system of claim 14, wherein the male formation includes an enlarged head shaped and dimensioned to be retained by the sliding members within the recess.

16. A pen-based computing system comprising:

a base unit comprising:
 a first and second panel connected by a flexible hinge;
 wherein the first panel has a generally flat body including a keyboard and at least one longitudinal track shaped and dimensioned to receive a rotatable member of a tablet unit, comprising a processing component and a display component including a digitizer to capture data entered with the pen and housed within an enclosure, therein, thereby to check sliding motion of the tablet unit relative to the first panel when the tablet unit is supported by the first panel so that it makes an acute angle therewith;
 wherein the flexible hinge comprises a curved portion extending into the second panel;
 wherein the second panel is in contact with the tablet unit in the said acute angle with the first panel;
 wherein the curved section of the hinge is coplanar with the bottom surface of the first panel.

17. The system of claim 16, wherein the second panel is displaceable relative to the first panel to prop the tablet unit in a viewing position in which the display screen makes a viewing angle with the keyboard of greater than 90 degrees.

18. The system of claim 17, wherein the tablet unit and the first panel have complementary formations to prevent sliding movement of the tablet unit relative to the first panel when in the viewing position;

wherein the complementary formations include a male formation on the tablet unit shaped and dimensioned to mate with a complementary female formation on the first panel;

wherein the first panel includes a plurality of the female formations spaced along a longitudinal axis;

wherein each female formation comprises two sliding members having ends contoured to form a recess to receive the male formation therein in a snug fit, wherein the sliding members are urged toward each other to close the recess; and wherein the male formation includes an enlarged head shaped and dimensioned to be retained by the sliding members within the recess.

19. A pen-based computing system comprising:

a tablet unit comprising a display screen, a digitizer to capture data entered with the pen and an electronic assembly housed within an enclosure; and a separate base unit including two panels connected via a hinge positioned at an edge of each of the two panels' coupling points to one another, a first one of the panels bearing a keyboard, and a second one of the panels being displaceable relative to the first panel to prop the tablet unit in a viewing position in which the display screen makes a viewing angle with the keyboard of greater than 90 degrees, wherein the tablet unit and the first panel have complementary formations to prevent sliding movement of the tablet unit relative to the first panel when in the viewing position;

wherein the complementary formations include a male formation on the tablet unit shaped and dimensioned to mate with a complementary female formation on the first panel;

wherein the first panel includes a plurality of the female formations spaced along a longitudinal axis; and wherein each female formation comprises two sliding members having ends contoured to form a recess to receive the male formation therein in a snug fit, wherein the sliding members are urged toward each other to close the recess.

20. The system of claim 19, wherein the male formation is operable between a stowed position in which it resides within the enclosure of the tablet unit, and an extended position in which it protrudes from the enclosure.

21. The system of claim 19, wherein the male formation is pivotally mounted to the enclosure.

22. The system of claim 19, wherein the male formation includes an enlarged head shaped and dimensioned to be retained by the sliding members within the recess.

23. The system of claim 19, further comprising:

a flexible hinge connecting the first and second panels;

wherein the second panel comprises a curved portion near the hinge; and wherein, when the tablet is in a viewing position and the second panel is in contact with the tablet unit and the bottom of the first panel rests on a planar surface, the curved portion of the second panel lies in the same planar surface as the bottom of the first panel.

* * * * *